US007903917B2

(12) United States Patent
Bickham et al.

(10) Patent No.: US 7,903,917 B2
(45) Date of Patent: Mar. 8, 2011

(54) LOW BEND LOSS SINGLE MODE OPTICAL FIBER

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Daniel Aloysius Nolan, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/612,348

(22) Filed: Nov. 4, 2009

(65) Prior Publication Data

US 2010/0046899 A1 Feb. 25, 2010

Related U.S. Application Data

(63) Continuation of application No. 11/888,959, filed on Aug. 3, 2007, now Pat. No. 7,620,282.

(60) Provisional application No. 60/841,490, filed on Aug. 31, 2006.

(51) Int. Cl.
*G02B 6/02* (2006.01)

(52) U.S. Cl. ..................................... 385/124; 428/411.1

(58) Field of Classification Search .................. 385/124
See application file for complete search history.

(56) References Cited

U.S. PATENT DOCUMENTS

| | | | | |
|---|---|---|---|---|
| 4,114,980 | A * | 9/1978 | Asam et al. | 385/127 |
| 4,385,802 | A * | 5/1983 | Blaszyk et al. | 385/127 |
| 4,852,968 | A | 8/1989 | Reed | 350/96.33 |
| 5,106,402 | A * | 4/1992 | Geittner et al. | 65/391 |
| 5,175,785 | A * | 12/1992 | Dabby | 385/123 |
| 5,235,660 | A * | 8/1993 | Perry et al. | 385/124 |
| 5,491,581 | A * | 2/1996 | Roba | 359/341.3 |
| 5,586,205 | A * | 12/1996 | Chen et al. | 385/29 |
| 5,673,354 | A * | 9/1997 | Akasaka et al. | 385/127 |
| 6,181,858 | B1 * | 1/2001 | Kato et al. | 385/123 |
| 6,185,353 | B1 * | 2/2001 | Yamashita et al. | 385/124 |
| 6,280,850 | B1 * | 8/2001 | Oh et al. | 428/428 |
| 6,317,551 | B1 | 11/2001 | Mitchell et al. | 385/124 |
| 6,396,987 | B1 * | 5/2002 | de Montmorillon et al. | 385/123 |
| 6,415,089 | B2 * | 7/2002 | Kato et al. | 385/123 |
| 6,424,776 | B1 * | 7/2002 | Nouchi et al. | 385/123 |

(Continued)

FOREIGN PATENT DOCUMENTS

DE 37 00 565 7/1988

(Continued)

OTHER PUBLICATIONS

Allard, Philippe G et al, "Bending loss of a single-mode triangular-index fiber with a depressed cladding ring by a vector mode method", SPIE vol. 1792 (1992), pp. 146-155.

(Continued)

*Primary Examiner* — Charlie Peng
*Assistant Examiner* — Peter Radkowski
(74) *Attorney, Agent, or Firm* — Robert L. Carlson

(57) ABSTRACT

Optical waveguide fiber that is bend resistant and single mode at 1260 nm and at higher wavelengths. The optical fiber includes a core of radius $R_1$ and cladding, the cladding having an annular inner region of radius $R_2$, an annular ring region, and an annular outer region. The annular ring region starts at $R_2$, and the ratio $R_1/R_2$ is greater than 0.40.

20 Claims, 3 Drawing Sheets

100
$R_3$
$R_2$
$R_1$
$R_4$
60
50
30
200
210
20

U.S. PATENT DOCUMENTS

| | | | | |
|---|---|---|---|---|
| 6,477,305 | B1 | 11/2002 | Berkey et al. | 385/123 |
| 6,490,396 | B1 * | 12/2002 | Smith | 385/123 |
| 6,510,268 | B1 * | 1/2003 | de Montmorillon et al. | 385/123 |
| 6,530,244 | B1 * | 3/2003 | Oh et al. | 65/417 |
| 6,535,676 | B1 * | 3/2003 | de Montmorillon et al. | 385/123 |
| 6,658,190 | B2 * | 12/2003 | Hirano et al. | 385/124 |
| 6,754,425 | B2 * | 6/2004 | Jeon et al. | 385/127 |
| 6,856,744 | B2 * | 2/2005 | Kumano | 385/127 |
| 6,885,802 | B2 * | 4/2005 | Oliveti et al. | 385/123 |
| 6,901,196 | B2 | 5/2005 | Takahashi et al. | 385/106 |
| 6,904,772 | B2 | 6/2005 | Berkey et al. | 65/412 |
| 6,928,211 | B2 * | 8/2005 | Tanigawa et al. | 385/24 |
| 7,008,696 | B2 * | 3/2006 | Kim et al. | 428/432 |
| 7,164,835 | B2 * | 1/2007 | Matsuo et al. | 385/127 |
| 7,171,090 | B2 * | 1/2007 | Mattingly et al. | 385/124 |
| 7,187,833 | B2 | 3/2007 | Mishra | 385/127 |
| 7,272,289 | B2 * | 9/2007 | Bickham et al. | 385/128 |
| 7,283,714 | B1 * | 10/2007 | Gapontsev et al. | 385/126 |
| 7,450,807 | B2 * | 11/2008 | Bickham et al. | 385/126 |
| 7,620,282 | B2 * | 11/2009 | Bickham et al. | 385/124 |
| 7,676,129 | B1 * | 3/2010 | Bookbinder et al. | 385/123 |
| 2003/0081921 | A1 * | 5/2003 | Sillard et al. | 385/124 |
| 2003/0210878 | A1 * | 11/2003 | Kumano et al. | 385/127 |
| 2004/0033039 | A1 * | 2/2004 | Oliveti et al. | 385/123 |
| 2004/0086245 | A1 * | 5/2004 | Farroni et al. | 385/123 |
| 2006/0140560 | A1 * | 6/2006 | Allen et al. | 385/123 |
| 2007/0003199 | A1 * | 1/2007 | Mattingly et al. | 385/124 |
| 2007/0258686 | A1 * | 11/2007 | De Montmorillon et al. | 385/127 |
| 2007/0280615 | A1 * | 12/2007 | de Montmorillon et al. | 385/127 |
| 2008/0013905 | A1 * | 1/2008 | Bookbinder et al. | 385/124 |

FOREIGN PATENT DOCUMENTS

| | | |
|---|---|---|
| WO | WO 01/47822 A1 | 7/2001 |

OTHER PUBLICATIONS

Allard, Philippe G et al, "Bending-loss studies of a single-mode triangular-index fiber with a depressed cladding ring with a vector-mode method", Applied Optics, vol. 33, No. 33, Nov. 20, 1994, pp. 7725-7732.

Jeunhomme, Luc B., *Single-Mode Fiber Optics, Principles and Applications*, Second Edition, Revised and Expanded, pp. 39-44.

Yip, G L et al, "Dispersion Studies of a Single-Mode Triangular-Core Fiber with a Trench by the Vector Mode Analysis", 1989 IEEE MTT-S Digest, pp. 1175-1178.

Yip, Gar Lam et al, "Dispersion studies of a single-mode triangular-index fiber with a trench by the vector mode analysis", Applied Optics, vol. 29, No. 36, Dec. 20, 1990, pp. 5343-5352.

Matsuo S et al., "Low-Bending-Loss and Low-Splice-Loss Single-Mode Fibers Employing a Trench Index profile", IEICE Transactions on Electronics, Electronics Society, Tokyo, JP, vol. E88-C, No. 5, May 2005, pp. 889-895.

* cited by examiner

LOW BEND LOSS SINGLE MODE OPTICAL FIBER

CROSS-REFERENCE TO RELATED APPLICATIONS

This application is a continuation of U.S. patent application Ser. No. 11/888,959 filed on Aug. 3, 2007 now U.S. Pat. No. 7,620,282 which claims the benefit of and priority to U.S. Provisional Patent Application No. 60/841,490 filed on Aug. 31, 2006, entitled, "Low Bend Loss Single Mode Optical Fiber", the contents of which is relied upon and incorporated herein by reference in its entirety.

BACKGROUND OF THE INVENTION

1. Field of the Invention

The present invention relates generally to optical fiber, and particularly to bend resistant single moded optical fibers.

2. Technical Background

Optical fibers utilized in so-called "access" and fiber to the premises (FTTx) optical networks can be subjected to a variety of bending environments. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

SUMMARY OF THE INVENTION

Optical waveguide fiber is disclosed herein that is bend resistant and single moded at the wavelength of 1260 nm and at higher wavelengths. The optical fiber has a large effective area, which is beneficial, for example, for inhibiting signal nonlinearities especially at high bit rates. Preferably, the optical fiber has both low macrobend induced attenuation losses and low microbend induced attenuation losses.

The optical fiber disclosed herein comprises a glass core and a glass cladding surrounding and in contact with the core, the core being disposed about a centerline and extending from the centerline in a radial direction. The cladding comprises an annular inner region surrounding and in contact with the core region, an annular ring region surrounding and in contact with the annular inner region, and an annular outer region surrounding and in contact with the annular ring region and extending to an outermost glass radius. The annular ring region is located close to the core, and preferably the core and cladding provide increased bend resistance, both to macrobend and microbend conditions. Preferably, the ratio of the outermost radius of the core divided by the outermost radius of the annular inner region is greater than 0.40. The annular outer region is the outermost glass portion of the optical fiber. In preferred embodiments, the annular outer region is covered by one or more coatings, such as a urethane acrylate material.

The maximum relative refractive index of the glass core is less than 0.45%. The minimum relative refractive index of the annular ring region is less than or equal to −0.1%. The magnitude of the relative refractive index of the annular inner region is low, less than 0.05%. The relative refractive index of the majority of the radial width of the annular inner region can be positive, negative, and/or zero. The radial width of the annular inner region is greater than 2 μm.

The maximum relative refractive index of the core is the greatest maximum relative refractive index of the entire optical fiber. The maximum relative refractive index of the annular inner region is greater than or equal to the minimum relative refractive index of the annular inner region. The minimum relative refractive index of the annular inner region is greater than the minimum relative refractive index of the annular ring region. The absolute magnitude of the profile volume of the annular ring region is greater than 20%-μm$^2$, preferably between 20 and 80%-μm$^2$. Preferably, the profile volume of the core is less than 6.2%-μm$^2$, more preferably between 5.0 and 6.2 μm$^2$. Preferably, the radial width of the core is less than or equal to 5.0 μm, more preferably between 3.0 and 5.0 μm.

In one set of embodiments, the annular ring region comprises silica glass having a dopant selected from the group consisting of germanium, aluminum, phosphorus, titanium, boron, and fluorine.

In another set of embodiments, the annular ring region comprises silica glass with a plurality of holes, the holes being either empty (vacuum) or gas filled, wherein the holes provide an effective refractive index which is low, e.g. compared to pure silica.

Reference will now be made in detail to the present preferred embodiments of the invention, examples of which are illustrated in the accompanying drawings.

DETAILED DESCRIPTION OF THE PREFERRED EMBODIMENT

Figure 1:
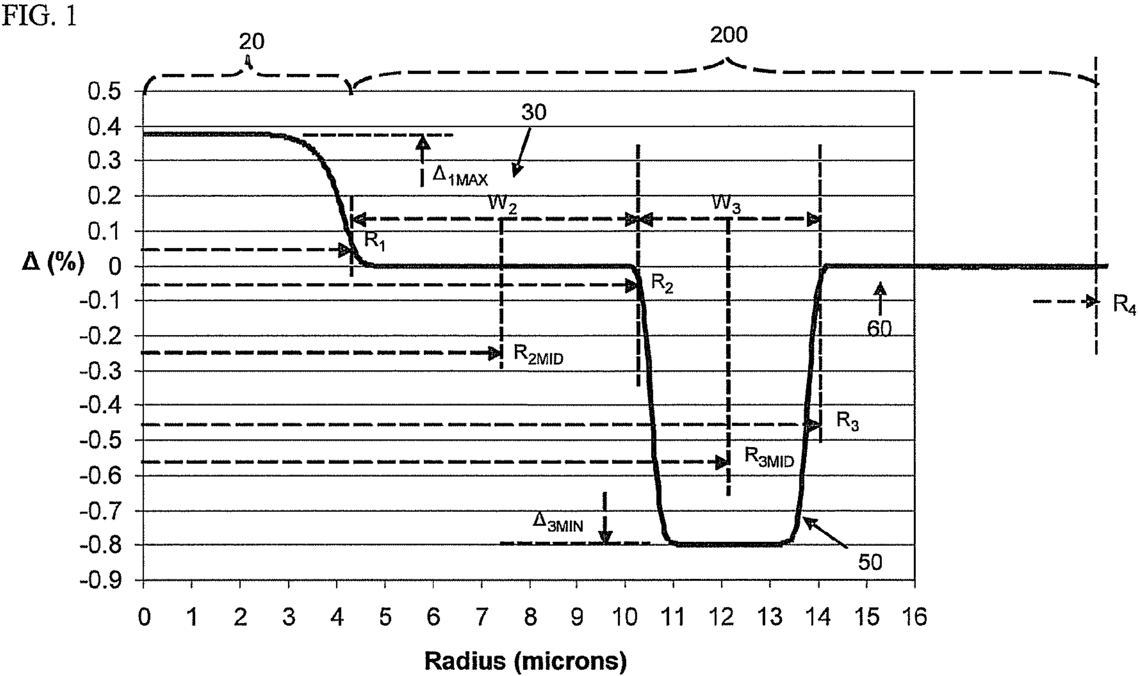
FIG. 1 schematically shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\%=100\times(n_i^2-n_c^2)/2n_i^2$, where $n_i$ is the maximum refractive index in region i, unless otherwise specified, and $n_c$ is the average refractive index of the annular outer region of the cladding. As used herein, the relative refractive index is represented by $\Delta$ and its values are given in units of "%", unless otherwise specified. In cases where the refractive index of a region is less than the average refractive index of the annular outer region, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff}=2\pi(\int f^2 r\, dr)^2/(\int f^4 r\, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_o)]^\alpha),$$

where $r_o$ is the point at which $\Delta(r)$ is maximum, $r_1$ is the point at which $\Delta(r)$% is zero, and r is in the range $r_i \leqq r \leqq r_f$, where $\Delta$ is defined above, $r_i$ is the initial point of the $\alpha$-profile, $r_f$ is the final point of the $\alpha$-profile, and a is an exponent which is a real number.

The mode field diameter (MFD) is measured using the Peterman II method wherein, 2w=MFD, and $w^2=(2\int f^2\, r\, dr/\int [df/dr]^2\, r\, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170". By cable cutoff as used herein, we mean the value obtained using the approximated test.

Unless otherwise noted herein, optical properties (such as dispersion, dispersion slope, etc.) are reported for the LP01 mode. Unless otherwise noted herein, a wavelength of 1550 nm is the reference wavelength.

An optical transmission line as used herein includes a length of optical fiber, or a plurality of optical fibers fused together serially, extending between optical devices, for example between two optical amplifiers, or between a multiplexing device and an optical amplifier. The optical transmission line may comprise transmission fiber and dispersion compensating fiber, wherein the dispersion compensating fiber may be deployed in a module (DC module) or laid out lengthwise, or both, as selected to achieve a desired system performance or parameter such as residual dispersion at the end of an optical transmission line.

The optical fiber 10 disclosed herein comprises a core 100 and a cladding layer (or cladding) 200 surrounding and directly adjacent the core. The cladding 200 has a refractive index profile, $\Delta_{CLAD}(r)$. In some embodiments, the cladding 200 consists of pure silica.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber disclosed herein is non-negative from the centerline to the inner radius of the annular segment, $R_2$. In some embodiments, the optical fiber contains no index-decreasing dopants in the core.

Referring to FIG. 1, optical waveguide fibers 100 are disclosed herein which comprise: a core 20 extending radially outwardly from the centerline to a central segment outer radius, $R_1$, and having a relative refractive index profile, $\Delta_1(r)$ in %, with a maximum relative refractive index percent, $\Delta_{1MAX}$; and, a cladding 200 surrounding and directly adjacent, i.e. in direct contact with, the core 20. Cladding 200 comprises: an annular inner region 30 surrounding the core 20 and directly adjacent thereto, extending radially outwardly to an annular inner region outer radius, $R_2$, having a width $W_2$ disposed at a midpoint $R_{2MID}$, the region 30 having a relative refractive index profile, $\Delta_2(r)$ in %, with a maximum relative refractive index percent, $\Delta_{2MAX}$, in %, a minimum relative refractive index percent, $\Delta_{2MIN}$, in %, and a maximum absolute magnitude relative refractive index percent, $|\Delta_2(r)|_{MAX}$; an annular ring region 50 surrounding region 30 and directly adjacent thereto, and extending radially outwardly from $R_2$ to an annular ring region radius, $R_3$, the region 50 having a width $W_3$ disposed at a midpoint $R_{3MID}$, and having a relative refractive index profile, $\Delta_3(r)$ in %, with a minimum relative refractive index percent, $\Delta_{3MIN}$, in %, wherein $\Delta_{1MAX}>0>\Delta_{3MIN}$; and an annular outer region 60 surrounding the region 50 and directly adjacent thereto and having a relative refractive index percent, $\Delta_{CLAD}(r)$ in %. $R_1$ is defined to occur at the radius where $\Delta_1(r)$ first reaches +0.05%. That is, core 20 ends and the annular ring region 30 starts where the relative refractive index first reaches +0.05% (going outward radially) at a radius R1, and region 30 is defined to end at a radius R2 where the relative refractive index $\Delta_2(r)$ first reaches −0.05% (going outward radially). The annular ring region 50 begins at $R_2$ and ends at $R_3$ for this group of embodiments. $R_3$ is defined to occur where the relative refractive index $A_3(r)$ first reaches −0.05% (going outward radially) after $A_3(r)$ has dipped to at least −0.1%. The width $W_3$ of the annular segment is $R_3$-$R_2$ and its midpoint $R_{3MID}$ is $(R_2+R_3)/2$. In some embodiments, more than 90% of the radial width of the central segment has a positive relative refractive index, and in some embodiments $\Delta_1(r)$ is positive for all radii from 0 to $R_1$. In some embodiments, $|\Delta_2(r)|<0.025\%$ for more than 50% of the radial width of the annular inner region 30, and in other embodiments $|\Delta_2(r)|<0.01\%$ for more than 50% of the radial width of the annular inner region 30. $\Delta_3(r)$ is negative for all radii from $R_2$ to $R_3$. Preferably, $\Delta_{CLAD}(r)=0\%$ for all radii greater than 30 μm. The core ends and the cladding begins at a radius $R_{CORE}$. Cladding 200 extends to a radius, $R_4$, which is also the outermost periphery of the glass part of the optical fiber. Also, $\Delta_{1MAX}>\Delta_{2MAX}>\Delta_{3MIN}$, and $\Delta_{MAX}>\Delta_{2MIN}>\Delta_{3MIN}$. When we say, for example, $\Delta<-0.1\%$, we mean Δ is more negative than −0.1%.

The core has a profile volume, $V_1$, defined herein as:

$$2\int_0^{R_1}\Delta_1(r)dr.$$

The annular ring region has a profile volume, $V_3$, defined herein as:

$$2\int_{R_2}^{R_3}\Delta_3(r)dr.$$

Preferably, $\Delta_{1MAX}<0.45\%$, $\Delta_{2MIN}>-0.05\%$, $\Delta_{2MAX}<0.05\%$, $\Delta_{3MIN}\leqq-0.1\%$, $R_1\leqq5.0$ μm, $R_1/R_2>0.4$, more preferably >0.42, and even more preferably >0.45 and the absolute magnitude of the profile volume of the annular ring region, $|V_3|$, is greater than 20%-μm². In some embodiments, $0.4<R_1/R_2<0.5$. In some preferred embodiments, $\Delta_{3MIN}\leqq-0.12\%$, and in some even more preferred embodiments, $\Delta_{3MIN}\leqq-0.2\%$.

Preferably, $W_2>2$ μm.

In some embodiments, 20%-μm²<$|V_3|$<80%-μm². In other embodiments, 30%-μm²<$|V_3|$<70%-μm². In other embodiments, 40%-μm²<$|V_3|$<60%-μm².

Preferably, $0.28\%<\Delta_{1MAX}<0.45\%$, more preferably $0.30\%<\Delta_{1MAX}<0.40\%$, and in some embodiments $0.31\%\leqq\Delta_{1MAX}\leqq0.38\%$.

In some embodiments, $R_1<5.0$ μm, and in other embodiments 3.0 μm<$R_1$<5.0 μm, and in still other embodiments 4.0 μm<$R_1$<5.0 μm.

Preferably, $R_2>8.0$ μm, and in some embodiments 8.0 μm<$R_2$<12.0 μm.

Preferably, $R_3>10.0$ μm, and in some embodiments 10.0 μm<$R_3$<20.0 μm.

In some embodiments $W_3>1.0$ μm, and in other embodiments $1.0<W_3<8.0$ μm, and in other embodiments $2.0<W_3<8.0$ μm.

Preferably, $R_4>40$ μm. In some embodiments, $R_4>50$ μm. In other embodiments, $R_4>60$ μm. In some embodiments, 60 μm<$R_4$<70 μm.

Preferably, the optical fiber disclosed herein provides: a mode field diameter at 1310 nm of 8.20 μm to 9.50 μm, more preferably 8.2 μm to 9.0 μm; a zero dispersion wavelength between 1300 and 1324 nm; and a cable cutoff wavelength less than 1260 nm. As the cable cutoff wavelength is not more than (and in some embodiments about equal to) the 2 m fiber cutoff wavelength, a 2 m fiber cutoff wavelength of less than 1260 nm results in a cable cutoff wavelength less than 1260 nm.

1st Set of Embodiments

Figure 2:
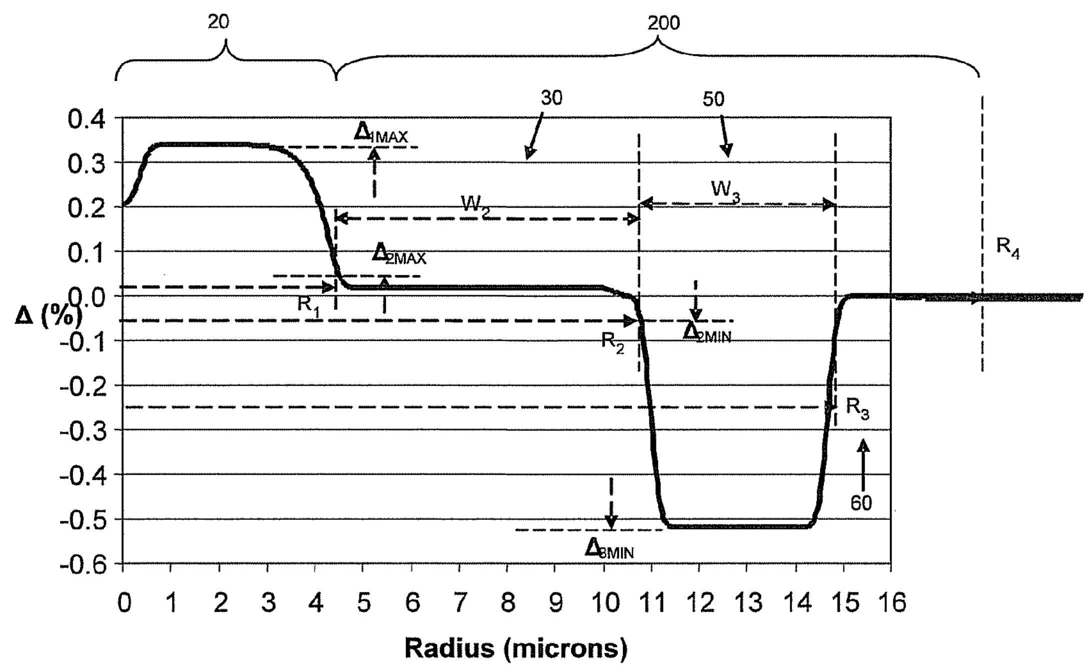
FIG. 2 schematically shows a relative refractive index measurement profile of another embodiment of an optical waveguide fiber as disclosed herein.
Figure 3:
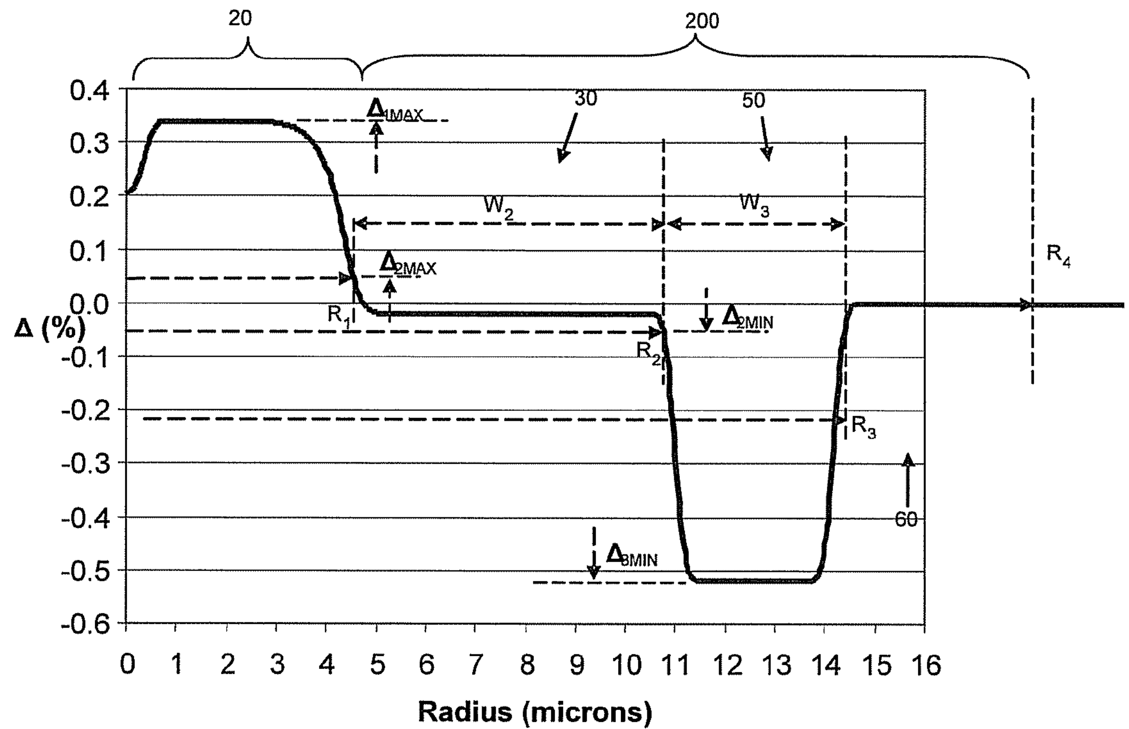
FIG. 3 schematically shows a relative refractive index measurement profile of yet another embodiment of an optical waveguide fiber as disclosed herein.

Tables 1-2 list characteristics of illustrative examples, Examples 1-4, of a first set of embodiments. FIG. 1 schematically shows a refractive index profile corresponding to Example 1, which is also representative of Example 2 but with the values listed below. FIGS. 2 and 3 schematically show refractive index profiles corresponding to Examples 3 and 4, respectively.

TABLE 1

| | | Example | | | |
|---|---|---|---|---|---|
| | | 1 | 2 | 3 | 4 |
| $\Delta_{1MAX}$ | % | 0.34 | 0.38 | 0.34 | 0.34 |
| $R_1$ | μm | 4.6 | 4.4 | 4.5 | 4.6 |
| $\alpha_1$ | | 10 | 10 | 10 | 10 |
| $V_1$ | %-μm² | 5.96 | 5.95 | 5.75 | 5.91 |
| $R_2$ | μm | 11.2 | 10.6 | 10.8 | 10.8 |
| $R_1/R_2$ | | 0.41 | 0.42 | 0.42 | 0.43 |
| $W_2$ | μm | 6.6 | 6.2 | 6.3 | 6.2 |
| $R_{2MID}$ | μm | 7.9 | 7.5 | 7.7 | 7.7 |
| $\Delta_{3MIN}$ | % | −0.66 | −0.72 | −0.52 | −0.52 |
| $R_3 = R_{CORE}$ | μm | 14.3 | 12.7 | 14.9 | 14.4 |
| $W_3$ | μm | 3.1 | 2.1 | 4.1 | 3.6 |
| $R_{3MID}$ | μm | 12.8 | 11.7 | 12.9 | 12.6 |
| $\|V_3\|$ | %-μm² | 43.8 | 32.2 | 49.2 | 41.7 |

TABLE 2

| | | Example | | | |
|---|---|---|---|---|---|
| | | 1 | 2 | 3 | 4 |
| Dispersion @ 1310 nm | ps/nm-km | 0.42 | 0.05 | 0.17 | 0.81 |
| Slope @ 1310 nm | ps/nm²-km | 0.089 | 0.088 | 0.090 | 0.089 |
| Lambda Zero | nm | 1305 | 1309 | 1308 | 1301 |
| MFD @ 1310 nm | μm | 9.11 | 8.69 | 9.27 | 9.02 |
| MFD @ 1550 nm | μm | 10.25 | 9.79 | 10.47 | 10.10 |
| Aeff @ 1550 nm | μm² | 80.5 | 73.5 | 83.8 | 78.9 |
| Pin Array @ 1550 nm | dB | 7 | 5 | 7 | 9 |
| Lateral Load @ 1550 nm | dB/m | 0.33 | 0.20 | 0.39 | 0.35 |
| LP11 theoretical | nm | 1246 | 1245 | 1215 | 1261 |
| LP02 theoretical | nm | 781 | 780 | 753 | 793 |
| Fiber Cutoff (2 meter) | nm | 1230 | 1212 | 1208 | 1246 |
| Attenuation @ 1310 nm | dB/km | 0.338 | 0.340 | 0.339 | 0.339 |
| Attenuation @ 1380 nm | dB/km | 0.277 | 0.278 | 0.277 | 0.278 |
| Attenuation @ 1550 nm | dB/km | 0.191 | 0.193 | 0.191 | 0.192 |
| Dispersion @ 1550 nm | ps/nm-km | 18.1 | 17.5 | 18.1 | 18.4 |
| Slope @ 1550 nm | ps/nm²-km | 0.063 | 0.062 | 0.064 | 0.063 |

Some embodiments of the optical fiber disclosed herein, such as Examples 1-4, have $\Delta_{3MIN}$ less than or equal to −0.50%, 4.0 μm<R1<5.0, $V_1$<6.00%-μm, 9.0<$R_2$<12.0, 6.0<$W_2$<7.0, and 0.40<$R_1/R_2$<0.60, 2.0<$W_3$<5.0, 10.0<$R_3$<16.0, and 30<$|V_3|$<50.

Embodiments such as those depicted in FIGS. 2 and 3 have a non-zero Δ for more than 50% of the radial width of the annular inner region 30. FIG. 2 shows $\Delta_2$ (r)=+0.02% over a radial extent greater than 4 μm for Example 3 which has a width $W_2$=6.3 μm, and FIG. 3 shows $\Delta_2$ (r)=−0.02% over a radial extent greater than 4 μm for Example 4 which has a width $W_2$=6.2 μm.

In some embodiments, such as depicted in FIG. 3, the core 20 may comprise a relative refractive index profile having a so-called centerline dip which may occur as a result of one or more optical fiber manufacturing techniques. For example, the core may have a local minimum in the refractive index profile at radii less than 1 μm, wherein higher values for the relative refractive index (including the maximum relative refractive index for the core) occur at radii greater than r=0 μm.

$2^{nd}$ Set of Embodiments

Tables 3-4 list characteristics of illustrative examples, Examples 5-8, of a second set of embodiments. The refractive index profiles of Examples 5-8 are similar to FIG. 1, but with the following respective values.

TABLE 3

| | | Example | | | |
|---|---|---|---|---|---|
| | | 5 | 6 | 7 | 8 |
| $\Delta_{1MAX}$ | % | 0.38 | 0.36 | 0.33 | 0.38 |
| $R_1$ | μm | 4.4 | 4.4 | 4.5 | 4.4 |
| $\alpha_1$ | | 10 | 10 | 10 | 10 |
| $V_1$ | %-μm² | 5.95 | 5.86 | 5.62 | 5.95 |
| $R_2$ | μm | 9.1 | 10.4 | 10.7 | 9.4 |
| $R_1/R_2$ | | 0.48 | 0.42 | 0.42 | 0.47 |
| $W_2$ | μm | 4.7 | 6.0 | 6.2 | 5.0 |
| $R_{2MID}$ | μm | 6.8 | 7.4 | 7.6 | 6.9 |

TABLE 3-continued

| | | Example | | | |
|---|---|---|---|---|---|
| | | 5 | 6 | 7 | 8 |
| $\Delta_{3MIN}$ | % | −0.46 | −0.46 | −0.44 | −0.42 |
| $R_3 = R_{CORE}$ | μm | 14.8 | 14.9 | 15.2 | 14.9 |
| $W_3$ | μm | 5.7 | 4.5 | 4.5 | 5.5 |
| $R_{3MID}$ | μm | 12.0 | 12.7 | 13.0 | 12.2 |
| $\|V_3\|$ | %-μm² | 57.3 | 47.5 | 46.8 | 52.2 |

TABLE 4

| | | Example | | | |
|---|---|---|---|---|---|
| | | 5 | 6 | 7 | 8 |
| Dispersion @ 1310 nm | ps/nm-km | 0.60 | 0.25 | 0.33 | 0.44 |
| Slope @ 1310 nm | ps/nm²-km | 0.090 | 0.089 | 0.089 | 0.090 |
| Lambda Zero | nm | 1303 | 1307 | 1306 | 1305 |
| MFD @ 1310 nm | μm | 8.64 | 8.88 | 9.17 | 8.66 |
| MFD @ 1550 nm | μm | 9.66 | 9.99 | 10.33 | 9.69 |
| Aeff @ 1550 nm | μm² | 71.9 | 76.4 | 81.6 | 72.3 |
| Pin Array @ 1550 nm | dB | 3 | 5 | 10 | 3 |
| Lateral Load @ 1550 nm | dB/m | 0.13 | 0.23 | 0.43 | 0.14 |
| LP11 theoretical | nm | 1231 | 1235 | 1214 | 1235 |
| LP02 theoretical | nm | 774 | 775 | 762 | 776 |
| Fiber Cutoff (2 meter) | nm | 1227 | 1223 | 1208 | 1229 |
| Attenuation @ 1310 nm | dB/km | 0.340 | 0.339 | 0.338 | 0.340 |
| Attenuation @ 1380 nm | dB/km | 0.278 | 0.278 | 0.277 | 0.278 |
| Attenuation @ 1550 nm | dB/km | 0.192 | 0.192 | 0.191 | 0.192 |
| Dispersion @ 1550 nm | ps/nm-km | 18.6 | 18.0 | 18.1 | 18.3 |
| Slope @ 1550 nm | ps/nm²-km | 0.064 | 0.063 | 0.064 | 0.064 |

Some embodiments of the optical fiber disclosed herein, such as Examples 5-8, have $\Delta_{3MIN}$ less than or equal to −0.40%, 4.0 μm<R1<5.0, $V_1$<6.00%-μm, 9.0<$R_2$<12.0, 4.0<$W_2$<7.0, and 0.40<$R_1/R_2$<0.60, 4.0<$W_3$<6.0, 12.0<$R_3$<16.0, and 40<$|V_3|$<60.

3rd Set of Embodiments

Tables 5-6 list characteristics of illustrative examples, Examples 9-13, of a third set of embodiments. The refractive index profiles of Examples 9-13 are similar to FIG. 1, but with the following respective values.

TABLE 5

| | | Example | | | | |
|---|---|---|---|---|---|---|
| | | 9 | 10 | 11 | 12 | 13 |
| $\Delta_{1MAX}$ | % | 0.36 | 0.38 | 0.38 | 0.34 | 0.38 |
| $R_1$ | μm | 4.4 | 4.4 | 4.4 | 4.5 | 4.4 |

TABLE 5-continued

| | | Example | | | | |
|---|---|---|---|---|---|---|
| | | 9 | 10 | 11 | 12 | 13 |
| $\alpha_1$ | | 10 | 10 | 10 | 10 | 10 |
| $V_1$ | %-μm² | 5.78 | 5.95 | 5.95 | 5.70 | 5.95 |
| $R_2$ | μm | 8.9 | 8.3 | 8.1 | 9.9 | 10.4 |
| $R_1/R_2$ | | 0.49 | 0.53 | 0.54 | 0.45 | 0.42 |

TABLE 5-continued

| | | Example | | | | |
|---|---|---|---|---|---|---|
| | | 9 | 10 | 11 | 12 | 13 |
| $W_2$ | μm | 4.5 | 3.9 | 3.7 | 5.4 | 6.0 |
| $R_{2MID}$ | μm | 6.7 | 6.4 | 6.3 | 7.2 | 7.4 |
| $\Delta_{3MIN}$ | % | −0.37 | −0.32 | −0.24 | −0.20 | −0.12 |
| $R_3 = R_{CORE}$ | μm | 12.9 | 13.3 | 11.9 | 17.1 | 16.0 |
| $W_3$ | μm | 4.0 | 5.0 | 3.8 | 7.2 | 5.6 |
| $R_{3MID}$ | μm | 10.9 | 10.8 | 10.0 | 13.5 | 13.2 |
| $\|V_3\|$ | %-μm² | 30.0 | 32.1 | 17.1 | 36.4 | 17.2 |

TABLE 6

| | | Example | | | | |
|---|---|---|---|---|---|---|
| | | 9 | 10 | 11 | 12 | 13 |
| Dispersion @ 1310 nm | ps/nm-km | 0.79 | 0.88 | 0.80 | 0.22 | −0.19 |
| Slope @ 1310 nm | $ps/nm^2$-km | 0.091 | 0.090 | 0.090 | 0.089 | 0.087 |
| Lambda Zero | nm | 1301 | 1300 | 1301 | 1308 | 1312 |
| MFD @ 1310 nm | μm | 8.81 | 8.61 | 8.61 | 9.05 | 8.71 |
| MFD @ 1550 nm | μm | 9.84 | 9.58 | 9.61 | 10.21 | 9.86 |
| Aeff @ 1550 nm | $\mu m^2$ | 74.6 | 71.0 | 71.2 | 79.7 | 74.2 |
| Pin Array @ 1550 nm | dB | 7 | 4 | 5 | 9 | 5 |
| Lateral Load @ 1550 nm | dB/m | 0.28 | 0.17 | 0.20 | 0.39 | 0.23 |
| LP11 theoretical | nm | 1210 | 1224 | 1224 | 1218 | 1254 |
| LP02 theoretical | nm | 762 | 771 | 770 | 763 | 782 |
| Fiber Cutoff (2 meter) | nm | 1195 | 1210 | 1190 | 1207 | 1211 |
| Attenuation @ 1310 nm | dB/km | 0.339 | 0.340 | 0.340 | 0.338 | 0.340 |
| Attenuation @ 1380 nm | dB/km | 0.278 | 0.278 | 0.278 | 0.277 | 0.278 |
| Attenuation @ 1550 nm | dB/km | 0.192 | 0.192 | 0.192 | 0.191 | 0.193 |
| Dispersion @ 1550 nm | ps/nm-km | 18.7 | 18.8 | 18.4 | 17.8 | 16.9 |
| Slope @ 1550 nm | $ps/nm^2$-km | 0.063 | 0.063 | 0.061 | 0.062 | 0.060 |

Some embodiments of the optical fiber disclosed herein, such as Examples 5-8, have $\Delta_{3MIN}$ less than or equal to −0.10%, 4.0 μm<R1<5.0, $V_1$<6.00%-μm, 7.0<$R_2$<11.0, 3.0<$W_2$<7.0, and 0.40<$R_1/R_2$<0.60, 3.0<$W_3$<8.0, 10.0<$R_3$<18.0, and 20<$|V_3|$<50.

In some embodiments of the optical fiber disclosed herein, such as Examples 1-20, the optical fiber exhibits mode field diameter at 1310 nm of 8.60 μm to 9.25 μm; a zero dispersion wavelength between 1300 and 1324 nm; and 2 m fiber cutoff wavelength of less than 1260 nm, which results in a cable cutoff wavelength less than 1260 nm. Additionally, the 2 m fiber cutoff wavelength is preferably not too low, thereby preventing bend losses from being too high. For example, the 2 m fiber cutoff wavelengths of the embodiments of Examples 1-7 are greater than 1190 nm and less than 1260 nm.

The optical fibers disclosed herein exhibit superior bend resistance, both macrobend and microbend. The pin array bend loss at 1550 nm (attenuation increase associated with the optical fiber tested in a pin array), one measure of macrobend loss, is less than 15 dB, preferably less than 10 dB, and in some embodiments less than 5 dB. Also, the lateral load wire mesh loss at 1550 nm, one measure of microbend loss, is less than 0.5 dB, preferably less than 0.3 dB, and in some embodiments less than 0.2 dB.

We have also found that the LP11 theoretical cutoff wavelength generally can serve as an upper bound on the 2 m fiber cutoff wavelength for the optical fiber disclosed herein. As illustrated by Examples 1-20, the LP11 theoretical cutoff wavelength is less than 1280 nm, preferably less than 1270 nm, and even more preferably less than 1260 nm. We have also found that for a given core profile, increasing the magnitude of the profile volume, $|V_3|$, without limit causes the cutoff wavelength to increase to the point that the optical fiber is multimoded at 1310 nm or even at 1550 nm. Accordingly, in some embodiments, 20%-$\mu m^2$<$|V_3|$<80%-$\mu m^2$, in other embodiments, 30%-$\mu m^2$<$|V_3|$<70%-$\mu m^2$, and in other embodiments, 40%-$\mu m^2$<$|V_3|$<60%-$\mu m^2$.

We have also found that a higher core volume generally not only tends to increase the size of the mode field, but also raises the LP11 theoretical cutoff wavelength, and therefore tends to raise the 2 m fiber cutoff wavelength. Accordingly, in some embodiments, the profile volume of the core, V1, is greater than 0 and less than 6.5%-$\mu m^2$, in other embodiments less than 6.2%-$\mu m^2$, and in some embodiments, such as Examples 1-7, V1 is between 5.50 and 6.00%-$\mu m^2$.

The core 20 shown in FIGS. 1-3 have a refractive index profile with an alpha shape, wherein $\alpha_1$ is about 10. However, the core 20 could have other values of $\alpha_1$, or the core could have a profile shape other than an alpha profile, such as a multi-segmented core.

Example 21

Figure 4:
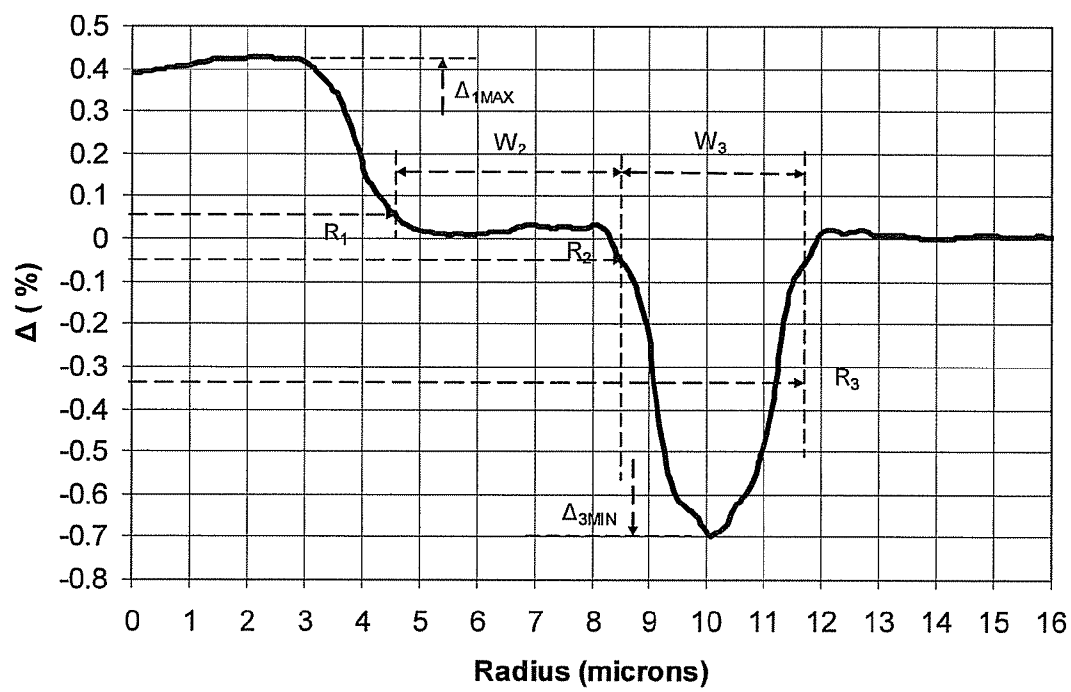
FIG. 4 shows a measured relative refractive index profile of an embodiment of an optical waveguide fiber as disclosed herein.

An optical fiber was manufactured via outside vapor deposition. The measured relative refractive index profile of the optical fiber is shown in FIG. 4. A germania doped silica glass core cane with a pure silica cladding served as a bait rod for chemical vapor deposition of a glass soot layer which was doped with fluorine and consolidated, then an outer layer of glass soot was applied and consolidated, to form an optical fiber preform. The preform was drawn into optical fiber having a germania doped core 20 surrounded by and in contact with a cladding 200, the cladding 200 having an annular inner region 30, an annular ring region 50, and an annular outer region 60, wherein $\Delta_{1MAX}$=0.43%, $R_1$=4.6 μm, $R_2$=8.5 μm, $\Delta_{3MIN}$=−0.70%, $R_3$=11.7 μm, $W_2$=3.9, $W_3$=3.2, $R_1/R_2$=0.54, $V_1$=6.4, and $V_3$=−28.3 ($|V_3|$=28.3). The measured 20 mm diameter bend test results (wrapping the optical fiber around a 20 mm diameter mandrel) at 1550 nm were: 0.028 dB/turn for 1 turn around the 20 mm diameter mandrel, and 0.126 dB/turn for 5 turns around the mandrel. The measured 10 mm diameter bend test results (wrapping the optical fiber around a 10 mm diameter mandrel) at 1550 nm was: 0.60 dB/turn for 1 turn around the 10 mm diameter mandrel. The measured MFD was 8.27 μm and 9.24 μm at 1310 nm and 1550 nm, respectively. The 2 m fiber cutoff was 1251 nm.

Figure 5:
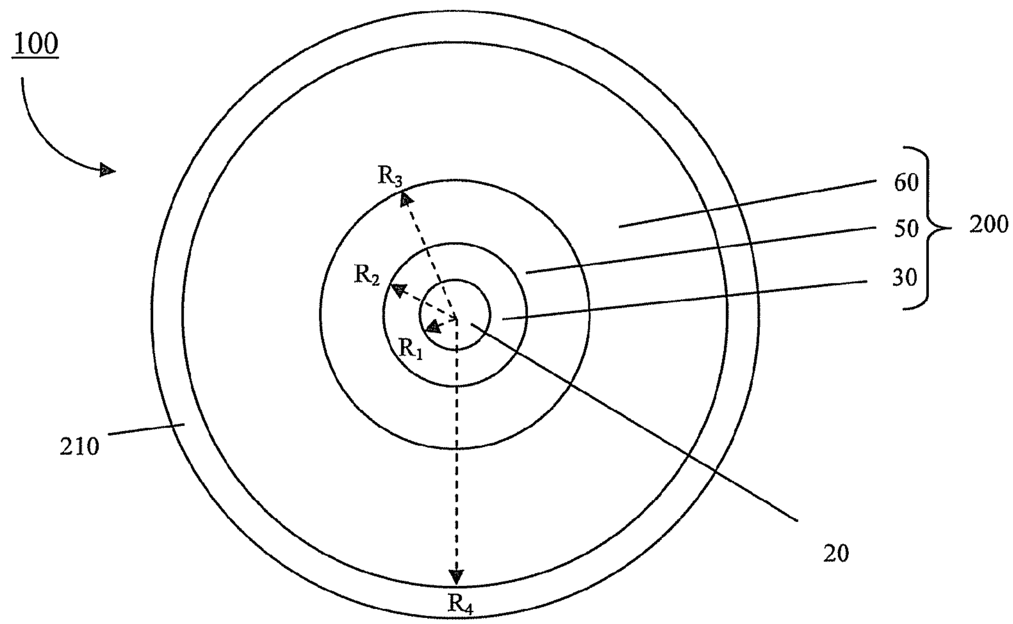
FIG. 5 is a schematic cross-sectional view of an embodiment of an optical waveguide fiber as disclosed herein.

FIG. 5 is a schematic representation (not to scale) of an optical waveguide fiber 100 as disclosed herein having core 20 and a cladding 200 directly adjacent and surrounding the core 20, the cladding 200 being comprised of an annular inner region 30, an annular ring region 50, and an annular outer region 60. The core 20 can have one or a plurality of core segments.

The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In preferred embodiments, the cladding has an outer diameter, 2* Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 6:
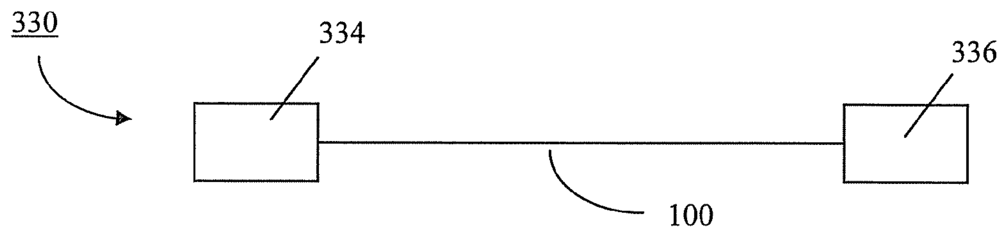
FIG. 6 is a schematic illustration of a fiber optic communication system employing an optical fiber as disclosed herein.

As shown in FIG. 6, an optical fiber 100 as disclosed herein may be implemented in an optical fiber communication system 330. System 330 includes a transmitter 334 and a receiver 336, wherein optical fiber 100 allows transmission of an optical signal between transmitter 334 and receiver 336. System 330 is preferably capable of 2-way communication, and transmitter 334 and receiver 336 are shown for illustration only. The system 330 preferably includes a link which has a section or a span of optical fiber as disclosed herein. The system 330 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Pat. No. 6,904,772, and PCT Application Publication No. WO01/47822.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein. The optical transmission line may also comprise a section of a second optical fiber having a negative dispersion at a wavelength of about 1550 nm, for example to effect dispersion compensation within the optical transmission line.

Figure 7:
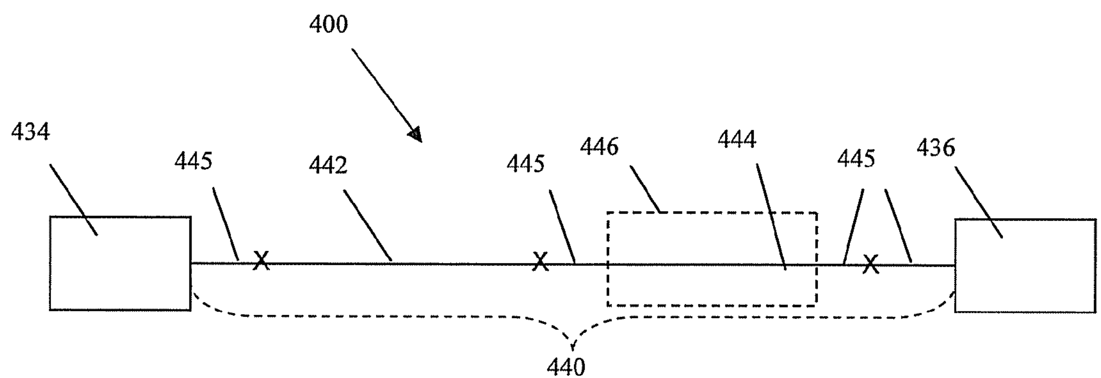
FIG. 7 schematically illustrates another embodiment of an optical fiber communication system disclosed herein.

FIG. 7 schematically illustrates another embodiment of an optical fiber communication system 400 disclosed herein. System 400 includes a transmitter 434 and a receiver 436 which are optically connected by optical transmission line 440. Optical transmission line 440 comprises a first fiber 442 which is a low attenuation large effective area optical fiber as disclosed herein, and a second optical fiber 444 having a negative dispersion at 1550 nm. The first fiber 442 and second fiber 444 may be optically connected by a fusion splice, an optical connector or the like, as depicted by the symbol "X" in FIG. 7. The optical transmission line 440 may also comprise one or more components and/or other optical fiber(s) (for example one or more "pigtail fibers" 445 at junctions between fibers and/or components). In preferred embodiments, at least a portion of the second optical fiber 444 is optionally disposed within a dispersion compensating module 446. Optical transmission line 440 allows transmission of an optical signal between transmitter 434 and receiver 436. The system preferably further comprises at least one amplifier, such as a Raman amplifier, optically coupled to the optical fiber section. The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 and 1565 nm.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:

a glass core extending from a centerline to a radius $R_1$;

a glass cladding surrounding and in contact with the core, the cladding comprising:

an annular inner region extending from $R_1$ to a radius $R_2$, the inner region comprising a radial width, $W_2=R_2-R_1$, an annular ring region extending from $R_2$ to a radius $R_3$, the ring region comprising a radial width, $W_3=R_3-R_2$, and an annular outer region extending from $R_3$ to an outermost glass radius $R_4$;

wherein the core comprises a maximum relative refractive index, $\Delta_{1MAX}$, relative to the outer region, and $\Delta_{1MAX}<0.45\%$;

wherein the annular inner region comprises a radial width, $W_2$, a minimum relative refractive index, $\Delta_{2MIN}$, relative to the outer region, and a maximum relative refractive index, $\Delta_{2MAX}$, relative to the outer region, wherein $W_2>2$ μm;

wherein the annular ring region comprises:

a minimum relative refractive index, $\Delta_{3MIN}$, relative to the annular outer region, wherein $\Delta_{3MIN}\leqq-0.1\%$;

wherein $\Delta A_{1MAX}>\Delta_{2MAX}>\Delta_{3MIN}$, and $\Delta_{1MAX}>\Delta_{2MIN}>\Delta_{3MIN}$;

wherein $R_1/R_2>0.40$; and wherein the core and the cladding provide a cable cutoff less than 1260 nm, a zero dispersion between 1300 and 1324 nm, and a 10 mm diameter mandrel bend loss of less than 1.0 dB/turn.

2. The optical fiber of claim 1 wherein the core and the cladding provide a 20 mm diameter mandrel bend loss of less than 0.05 dB/turn, and wherein $\Delta_{3MIN}\leqq-0.2\%$.

3. The optical fiber of claim 1 wherein $\Delta_{3MIN}\leqq-0.4\%$.

4. The optical fiber of claim 1 wherein the annular ring region comprises a profile volume, $V_3$, equal to:

$$2\int_{R_2}^{R_3}\Delta(r)\,dr;$$

wherein $|V_3|>20\%$-μm$^2$.

5. The optical fiber of claim 1 wherein $0.4<R_1/R_2<0.6$.

6. An optical fiber comprising:

a glass core extending from a centerline to a radius $R_1$;

a glass cladding surrounding and in contact with the core, the cladding comprising:

an annular inner region extending from $R_1$ to a radius $R_2$, the inner region comprising a radial width, $W_2=R_2-R_1$, an annular ring region extending from $R_2$ to a radius $R_3$, the ring region comprising a radial width, $W_3=R_3-R_2$, and an annular outer region extending from $R_3$ to an outermost glass radius $R_4$;

wherein the core comprises a maximum relative refractive index, $\Delta_{1MAX}$, relative to the outer region, and $\Delta_{1MAX}<0.45\%$;

wherein the annular inner region comprises a radial width, $W_2$, a minimum relative refractive index, $\Delta_{2MIN}$, relative to the outer region, and a maximum relative refractive index, $\Delta_{2MAX}$, relative to the outer region, wherein $W_2>2$ μm;

wherein the annular ring region comprises:

a minimum relative refractive index, $\Delta_{3MIN}$, relative to the annular outer region, wherein $\Delta_{3MIN}<-0.1\%$, and a profile volume, $V_3$, equal to:

$$2\int_{R_2}^{R_3}\Delta(r)\,dr;$$

wherein $|V_3|>20\%$-μm$^2$;

wherein $\Delta_{1MAX}>\Delta_{2MAX}>\Delta_{3MIN}$, and $\Delta_{1MAX}>\Delta_{2MIN}>\Delta_{3MIN}$; and wherein $R_1/R_2>0.40$.

7. The optical fiber of claim 6 wherein $0.40<R_1/R_2<0.60$.

8. The optical fiber of claim 6 wherein 20%-μm$^2<|V_3|<80\%$-μm$^2$.

9. The optical fiber of claim 6 wherein $0.28\%<\Delta_{1MAX}<0.45\%$.

10. The optical fiber of claim 6 wherein $R_1<5.0$ μm.

11. The optical fiber of claim 6 wherein $R_2>8$ μm.

12. The optical fiber of claim 6 wherein $R_3>10$ μm.

13. The optical fiber of claim 6 wherein $W_3$ is between 2 and 5 μm.

14. The optical fiber of claim 6 wherein the core comprises a profile volume, $V_1$, equal to:

$$2\int_{0}^{R_1}\Delta(r)\,dr;$$

wherein $V_1<6.2\%$-μm$^2$.

15. The optical fiber of claim 6 wherein the core and the cladding provide a fiber cutoff less than 1260 nm.

16. The optical fiber of claim 6 wherein the core and the cladding provide a zero dispersion between 1300 and 1324 nm.

17. The optical fiber of claim 6 wherein the core and the cladding provide a mode field diameter at 1310 nm of between 8.20 and 9.50 μm.

18. The optical fiber of claim 6 wherein the core and the cladding provide a 10 mm diameter mandrel bend loss of less than 1.0 dB/turn.

19. The optical fiber of claim 6 wherein the core and the cladding provide a 20 mm diameter mandrel bend loss of less than 0.05 dB/turn.

20. The optical fiber of claim 6 wherein the core and the cladding provide a pin array bend loss at 1550 nm of less than 10 dB.

* * * * *

Disclaimer 7,903,917—Scott Robertson Bickham, Corning, NY, Dana Craig Bookbinder, Corning, NY, Ming-Jun Li, Horseheads, NY; Snigdharjkumar Mishra, Wilmington, NC; Daniel Aloysius, Corning, NY; Pushkar Tandon, Painted Post, NY. LOW BEND LOSS SINGLE MODE OPTICAL FIBER. Patent dated March 08, 2011. Disclaimer filed Jan. 07, 2011, by the assignee, Corning Incorporated.

The term of this patent shall not extend beyond the expiration date of Pat. Nos. 7620282, 7450807 and 7676129.

(*Official Gazette* May 24, 2011)